US012768805B2

(12) United States Patent
Arumugam

(10) Patent No.: US 12,768,805 B2
(45) Date of Patent: Oct. 20, 2026

(54) PROCESS AND DEVICE FOR THE SPATIALLY RESOLVED LOCALIZATION OF DEFECTS IN MATERIALS

(71) Applicant: Sri Ranjini Arumugam, Leipzig (DE)

(72) Inventor: Sri Ranjini Arumugam, Leipzig (DE)

( * ) Notice: Subject to any disclaimer, the term of this patent is extended or adjusted under 35 U.S.C. 154(b) by 328 days.

(21) Appl. No.: 18/576,520

(22) PCT Filed: Jul. 4, 2022

(86) PCT No.: PCT/EP2022/068408
§ 371 (c)(1),
(2) Date: Jan. 4, 2024

(87) PCT Pub. No.: WO2023/280758
PCT Pub. Date: Jan. 12, 2023

(65) Prior Publication Data

US 2024/0328973 A1 Oct. 3, 2024

(30) Foreign Application Priority Data

Jul. 6, 2021 (DE) ..................... 10 2021 117 409.0

(51) Int. Cl.
*G01N 23/227* (2018.01)
*B82Y 35/00* (2011.01)

(52) U.S. Cl.
CPC ............ *G01N 23/227* (2013.01); *B82Y 35/00* (2013.01); *G01N 2223/646* (2013.01)

(58) Field of Classification Search
CPC ........... G01N 23/227; G01N 2223/646; G06N 10/40; B82Y 35/00
See application file for complete search history.

(56) References Cited

U.S. PATENT DOCUMENTS 6,002,136 A * 12/1999 Naeem .................... H01J 37/20 378/45
9,739,728 B1 * 8/2017 Bedell .................. G01N 23/203
(Continued)

FOREIGN PATENT DOCUMENTS

DE 102016103157 A1 9/2016
EP 2757558 A1 7/2014
(Continued)

OTHER PUBLICATIONS

Escher, et al., (2005). Nanoelectron spectroscopy for chemical analysis: a novel energy filter for imaging x-ray photoemission spectroscopy. Journal of Physics: Condensed Matter, 17(16), S1329-S1338. https://doi.org/10.1088/0953-8984/17/16/004 (Year: 2004).*
(Continued)

*Primary Examiner* — Wyatt A Stoffa
*Assistant Examiner* — Jing Wang
(74) *Attorney, Agent, or Firm* — Smartpat PLC

(57) ABSTRACT

A novel process allows defects in materials, in particular in solid bodies (18), to be localized with considerably higher spatial resolution than before. Defects can be quickly and economically imaged with high spatial resolution. It is possible to contactlessly spin-selectively excite and capture or image defects in the solid body with high sensitivity, high dynamic range, large field of view and excellent resolution, which far exceeds the present capabilities of optical detection processes. Furthermore, with the process there is an excellent possibility for detecting spin even in individual images, wherein high contrast of the spin states and better fidelity of reproduction of the spin states are made possible. The device (10) and the process are suitable for quantum calculation using defect spins in solid bodies (18), for quantum-capable capturing and for quantum-capable measurement networks.

18 Claims, 2 Drawing Sheets

(56) References Cited

U.S. PATENT DOCUMENTS

| | | | | |
|---|---|---|---|---|
| 2002/0135880 | A1* | 9/2002 | Fink | B82Y 20/00 359/586 |
| 2002/0136516 | A1* | 9/2002 | Allan | G02B 6/1225 385/125 |
| 2004/0056194 | A1* | 3/2004 | Moore | G01N 23/227 250/442.11 |
| 2004/0183530 | A1* | 9/2004 | Butters | G01N 37/005 324/247 |
| 2012/0293791 | A1 | 11/2012 | Milas et al. | |
| 2016/0254120 | A1 | 9/2016 | Grzelakowski | |
| 2017/0038411 | A1* | 2/2017 | Yacobi | G01R 33/62 |
| 2017/0373153 | A1* | 12/2017 | Narayan | H10D 62/812 |
| 2020/0020506 | A1* | 1/2020 | Shim | H01J 37/26 |
| 2020/0150060 | A1* | 5/2020 | Lee | G01N 23/18 |
| 2020/0211820 | A1* | 7/2020 | Lyons | H01J 37/28 |
| 2021/0080411 | A1 | 3/2021 | Dani et al. | |
| 2021/0140901 | A1* | 5/2021 | Shin | H01J 37/285 |
| 2021/0182727 | A1* | 6/2021 | Xu | G06N 3/0442 |
| 2022/0374756 | A1 | 11/2022 | Doherty et al. | |
| 2022/0407213 | A1 | 12/2022 | Dzurak et al. | |

FOREIGN PATENT DOCUMENTS

| | | | |
|---|---|---|---|
| EP | 3757558 | A1 | 12/2020 |
| JP | 2009092673 | A | 4/2009 |
| JP | 2016138801 | A | 8/2016 |
| JP | 2020085873 | A | 6/2020 |
| JP | 2020202167 | A | 12/2020 |
| WO | 2018159272 | A1 | 9/2018 |
| WO | 2021051163 | A1 | 3/2021 |
| WO | 2021092661 | A1 | 5/2021 |

OTHER PUBLICATIONS

Geelen, et al., (2015). eV-TEM: Transmission electron microscopy in a low energy cathode lens instrument. Ultramicroscopy, 159, 482-487. https://doi.org/10.1016/j.ultramic.2015.06.014 (Year: 2015).*

Nemanich, et al., (1999). Imaging electron emission from diamond and III-V nitride surfaces with photo-electron emission microscopy. Applied Surface Science, 146(1-4), 287-294. https://doi.org/10.1016/S0169-4332(99)00021-5. (Year: 1999).*

Escher, et al., (2005). Nanoelectron spectroscopy for chemical analysis: a novel energy filten for imaging x-ray photoemission spectroscopy. Journal of Physics: Condensed Matter, 17(16), S1329-S1338. https://doi.org/10.1088/0953-8984/17/16/004 (Year: 2004).*

Schmidt et al., (2013). First experimental proof for aberration correction in XPEEM: Resolution, transmission enhancement, and limitation by space charge effects. Ultramicroscopy, 126, 23-32. https://doi.org/10.1016/j.ultramic.2012.11.004 (Year: 2013).*

Biasiol, Giorgio, Stefan Heun, and Lucia Sorba. "Photoemission Microscopy Studies of Quantum Dots and Rings." Journal of nanoelectronics and optoelectronics 6, No. 1 (2011): 20-33.

Photoemission electron microscopy From Wikipedia, [retrieved from internet on Dec. 23, 2024] published on Aug. 9, 2020 as per Wayback Machine.

Zaitsev, A. M. Optical Properties of Diamond: A Data Handbook. Springer Science & Business Media, 2001. Preface.

Arai, Keigo, et al. "Fourier magnetic imaging with nanoscale resolution and compressed sensing speed-up using electronic spins in diamond." Nature nanotechnology 10.10 (2015): 859-864.

Balasubramanian, Gopalakrishnan, et al. "Ultralong spin coherence time in isotopically engineered diamond." Nature materials 8.5 (2009): 383-387.

Bassett, Lee C., Audrius Alkauskas, Annemarie L. Exarhos, and Kai-Mei C. Fu. "Quantum defects by design." Nanophotonics 8, No. 11 (2019): 1867-1888.

Bourgeois, Emilie, E. Londero, K. Buczak, Jaroslav Hruby, Michal Gulka, Yaso Balasubramaniam, G. Wachter et al. "Enhanced photoelectric detection of NV magnetic resonances in diamond under dual-beam excitation." Physical Review B 95, No. 4 (2017): 041402.

Bourgeois, Emilie, et al. "Photoelectric detection of electron spin resonance of nitrogen-vacancy centres in diamond." Nature Communications 6.1 (2015): 8577.

Castelletto, Stefania, B. C. Johnson, Viktor Ivády, N. Stavrias, T. Umeda, A. Gali, and T. Ohshima. "A silicon carbide room-temperature single-photon source." Nature materials 13, No. 2 (2014): 151-156.

DiVincenzo, David. "Better than excellent." Nature materials 9.6 (2010): 468-469.

Fukumoto, Keiki, et al. "Femtosecond time-resolved photoemission electron microscopy for spatiotemporal imaging of photogenerated carrier dynamics in semiconductors." Review of Scientific Instruments 85.8 (2014).

Goldman, Michael Lurie, et al. "Phonon-induced population dynamics and intersystem crossing in nitrogen-vacancy centers." Physical review letters 114.14 (2015): 145502.

Goldman, Michael Lurie, et al. "State-selective intersystem crossing in nitrogen-vacancy centers." Physical Review B 91.16 (2015): 165201.

Gruber, A., et al. "Scanning confocal optical microscopy and magnetic resonance on single defect centers." Science 276.5321 (1997): 2012-2014.

Harrison, Joanne, M. J. Sellars, and N. B. Manson. "Measurement of the optically induced spin polarisation of NV centres in diamond." Diamond and related materials 15.4-8 (2006): 586-588.

Haruyama, Moriyoshi, et al. "Triple nitrogen-vacancy centre fabrication by C5N4H n ion implantation." Nature communications 10.1 (2019): 2664.

Hell, Stefan W., and Jan Wichmann. "Breaking the diffraction resolution limit by stimulated emission: stimulated-emission-depletion fluorescence microscopy." Optics letters 19.11 (1994): 780-782.

Herbschleb, E. D., et al. "Ultra-long coherence times amongst room-temperature solid-state spins." Nature communications 10.1 (2019): 3766.

Ishiwata, Hitoshi, et al. "Perfectly aligned shallow ensemble nitrogen-vacancy centers in (111) diamond." Applied Physics Letters 111.4 (2017).

Jakobi, Ingmar, et al. "Efficient creation of dipolar coupled nitrogen-vacancy spin qubits in diamond." Journal of Physics: Conference Series. vol. 752. No. 1. IOP Publishing, 2016.

Neumann, P., et al. "Quantum register based on coupled electron spins in a room-temperature solid." Nature Physics 6.4 (2010): 249-253.

Ozawa, Hayato, et al. "Formation of perfectly aligned nitrogen-vacancy-center ensembles in chemical-vapor-deposition-grown diamond (111)." Applied Physics Express 10.4 (2017): 045501.

Pfender, Matthias, et al. "Single-spin stochastic optical reconstruction microscopy." Proceedings of the National Academy of Sciences 111.41 (2014): 14669-14674.

Rittweger, Eva, et al. "Sted microscopy reveals crystal colour centres with nanometric resolution." Nature Photonics 3.3 (2009): 144-147.

Robledo, Lucio, et al. "Spin dynamics in the optical cycle of single nitrogen-vacancy centres in diamond." New Journal of Physics 13.2 (2011): 025013.

Scarabelli, Diego, et al. "Nanoscale engineering of closely-spaced electronic spins in diamond." Nano Letters 16.8 (2016): 4982-4990.

Siyushev, Petr, et al. "Photoelectrical imaging and coherent spin-state readout of single nitrogen-vacancy centers in diamond." Science 363.6428 (2019): 728-731.

Smith, Jason M., Simon A. Meynell, Ania C. Bleszynski Jayich, and Jan Meijer. "Colour centre generation in diamond for quantum technologies." Nanophotonics 8, No. 11 (2019): 1889-1906.

Tamarat, Ph, N. B. Manson, J. P. Harrison, R. L. McMurtrie, A. Nizovtsev, C. Santori, R. G. Beausoleil et al. "Spin-flip and spin-conserving optical transitions of the nitrogen-vacancy centre in diamond." New Journal of Physics 10, No. 4 (2008): 045004.

Tran, Toan Trong, et al. "Quantum emission from hexagonal boron nitride monolayers." Nature nanotechnology 11.1 (2016): 37-41.

(56) References Cited

OTHER PUBLICATIONS

Zhang, Huiliang, et al. "Selective addressing of solid-state spins at the nanoscale via magnetic resonance frequency encoding." npj Quantum Information 3.1 (2017): 31.

* cited by examiner

PROCESS AND DEVICE FOR THE SPATIALLY RESOLVED LOCALIZATION OF DEFECTS IN MATERIALS

CROSS-REFERENCE TO RELATED APPLICATION

This application is a national stage application, filed under 35 U.S.C. § 371, of International Patent Application PCT/EP2022/068408, filed on Jul. 4, 2022, which claims the benefit of German Patent Application DE 10 2021 117 409.0, filed on Jul. 6, 2021.

TECHNICAL FIELD

The present disclosure relates to a process for the spatially resolved localization of defects in materials and to a device for the spatially resolved localization of defects in materials.

BACKGROUND

Within the framework of the present disclosure, a defect in a material is understood to be a structural or chemical change with which one or more electrons are captured and localized at the site of the defect. Such defects are mainly known from solid bodies. However, they could also be liquids or gases. The material can also contain one or more molecules.

If the material is insulating or semiconducting or has a band gap, such defects are characterized by electrons that have an energy level that lies within the band gap of the host material in the ground state (see Bassett, L. C., et al. (2019) "Quantum defects by design," Nanophotonics, 8 (11), pp. 1867-1888, DOI: 10.1515/nanoph-2019-0211). Such electrons can be excited to higher states and then return to the ground state through radiative or non-radiative processes. Defects that absorb photons and subsequently emit luminescence photons are called color centers. There are countless color centers in the solid state. For example, more than 500 types of luminescent color centers are known for diamond (see Zaitsev, A. M. (2001) Optical Properties of Diamond. Berlin, Heidelberg: Springer Berlin Heidelberg, DOI: 10.1007/978-3-662-04548-0). However, other materials such as silicon carbide (see Castelletto, S. et al. (2014), "A silicon carbide room-temperature single-photon source," Nature Materials, 13 (2), pp. 151-156, DOI: 10.1038/nmat3806), quartz and even two-dimensional materials, such as hexagonal boron nitride (see Tran, T. T. et al. (2016) "Quantum emission from hexagonal boron nitride monolayers," Nature Nanotechnology, 11 (1), pp. 37-41, DOI: 10.1038/nnano.2015.242), can also exhibit luminescence defects.

As mentioned, the electrons associated with these defects can absorb a specific wavelength band and emit a corresponding long-wavelength photon with a characteristic lifetime in the excited state. The emitted long-wavelength photons are usually collected through a microscope objective lens with a high numerical aperture (NA) and captured by a single photon counter or a photomultiplier tube. The device that can carry out this imaging is a confocal optical microscope. However, such optical detection has a resolution limitation, which is defined by half the wavelength of the light used for detection:

$$\text{Optical resolution } d=(0.51\cdot\lambda)/NA$$

Such resolution limit poses a major problem if a plurality of closely spaced color centers (defects in solid-body materials) are to be imaged. Although there are some methods to surpass this diffraction-limited resolution, such as STED ("stimulated emission depletion"-see Hell, S. W. and Wichmann, J. (1994) "Breaking the diffraction resolution limit by stimulated emission: stimulated-emission-depletion fluorescence microscopy," Optics Letters, 19 (11), p. 780, DOI: 10.1364/OL.19.000780) (see Rittweger, E. et al. (2009) "STED microscopy reveals crystal color centres with nanometric resolution," Nature Photonics, 3 (3), pp. 144-147, DOI: 10.1038/nphoton.2009.2), microwave-assisted STORM ("stochastic optical reconstruction microscopy"-see Pfender, M. et al. (2014) "Single-spin stochastic optical reconstruction microscopy," Proceedings of the National Academy of Sciences, 111 (41), pp. 14669-14674, DOI: 10.1073/pnas. 1404907111) and gradient-encoded imaging (see Arai, K. et al. (2015) "Fourier magnetic imaging with nanoscale resolution and compressed sensing speed-up using electronic spins in diamond," Nature Nanotechnology, 10 (10), pp. 859-864, DOI: 10.1038/nnano.2015.171) (see Zhang, H. et al. (2017) "Selective addressing of solid-state spins at the nanoscale via magnetic resonance frequency encoding," npj Quantum Information, 3 (1), p. 31, DOI: 10.1038/s41534-017-0033-3) etc. However, these are comparatively slow and require pixel-by-pixel scanning, which prevents any possibility of observing a large number of defects.

SUMMARY

It is an object of the present disclosure to provide a method with which defects in materials, preferably in solid bodies, can be localized with higher local resolution. In particular, such defects are to be imaged with high local resolution, which is particularly quick and cost-effective.

This object is achieved by the process and the device as disclosed herein.

It was recognized by the inventors that this object can be achieved in a surprisingly simple way by exciting the electrons associated with the defects with such energy that they are emitted from the material, and subsequently performing an electron imaging in order to determine the spatial position of the electrons emerging from the surface of the solid body and thus the corresponding defects.

The process for the spatially resolved localization of a defect in a material, wherein the material has a band gap, wherein the defect has one or more electrons having at least one energy level that lies in the band gap, characterized in that the electron is excited such that it is emitted from the material and subsequently an electron imaging is carried out.

Although the process of photoemission electron microscopy (PEEM), with which an imaging of emitted electrons is also effected, has also been used, this process does not achieve the necessary spatial resolution to detect defects in materials (i.e., a structural or chemical change with which an electron or a plurality of electrons are captured and localized at the location of the defect) in a spatially resolved manner. Instead, PEEM has only ever been used to characterize the bulk material (such as mass, lattice and ensemble of the material). Therefore, PEEM can be used to examine defect ensembles at most, wherein, for example, according to the publication K. Fukumoto et al.: "Imaging the defect distribution in 2D hexagonal boron nitride by tracing photogenerated electron dynamics," J. Phys. D: Appl. Phys. 53 (2020) 405106 (9pp), DOI: 10.1088/1361-6463/ab9860, a maximum resolution of 100 nm can be achieved, which is too low for the spatially resolved localization of a single defect or even quantum applications. By contrast, with the use of transmission electron microscopy (TEM), in particular cryo-TEM, spatial resolutions of up to 0.1 nm can be achieved.

In an advantageous further development, it is provided that at least one of the following elements is used: Aberration correction element, means for high magnification, objective lens with high numerical aperture, focusing element and acceleration column for increasing the energy of the electrons, because this allows very high resolutions to be achieved with high image quality and image robustness and automatic alignment.

In an advantageous further development, it is provided that the defect is imaged with a spatial resolution of 25 nm or better, preferably 20 nm or better and in particular in the range of 0.1 nm to 20 nm. This makes quantum applications possible, because quantum mechanical interactions of spins can then be resolved, which occur if such spins are spaced apart in the range of up to 25 nm.

In an advantageous further development, it is provided that electron imaging is carried out with the aid of electron optics and an electron detector, because the corresponding setup for the optics and detection, i.e. except for the electron source, can then be used by a conventional—for example, a commercially available-electron microscope, in particular a transmission electron microscope. Preferably, a microchannel plate (MCP—a two-dimensional, image-resolving secondary electron multiplier), a direct electron detector, an electron multiplier CCD (EMCCD), an sCMOS (scientific CMOS) or a phosphor screen is used as the electron detector, which enables images with high spatial resolution to be taken. Preferably, a magnetic element or an electromagnetic element is used as the electron optics, because this makes it particularly easy to collect and direct the electrons/manipulate the electrons for magnified imaging.

In an advantageous further development, it is provided that the excitation of the electron is effected by one or more electromagnetic waves, preferably light (infrared (300 GHz to 384 THz), visible light (384 THz to 789 THz), ultraviolet light (789 THz to 30 PHz)), radio waves (ultrashort waves (30 MHz to 300 MHz), short waves (3 MHz to 30 MHz), medium waves (300 kHz to 3 MHZ) and long waves (30 kHz to 300 kHz)), terahertz radiation (0.1 THz to 10 THz), low frequency (1 kHz to 30 kHz) or microwaves (1 GHz to 300 GHz). This makes it particularly easy to emit the electrons and the excitation energy can be defined for subsequent evaluation.

In an advantageous further development, it is provided that the excitation is focused on a region, preferably a surface region of the material, wherein in particular light is used that is focused by one or more optical elements, preferably an objective lens with a high numerical aperture, or that the excitation is effected with a LASER light source or that the excitation is effected in evanescent wave geometry or that the defect is arranged in a light-confining nanostructure, cavity or optical resonator. With excitation in evanescent wave geometry, the excitation can be limited to a depth of a few nanometers below the surface. By using a light-confining structure, such as a cavity, the excitation can be directed only to a specific defect. One or more of these measures can further increase the local resolution by stimulating only specific defects from the outset. It is also possible to select specific defects. Overall, one or more of these measures can be used to shape the excitation and thereby enable photoexcitation of the defect and subsequent photoemission of electrons from ranges much smaller than the diffraction limit (1 nm-1300 nm), as a result of which even higher localization resolutions, sensitivities and dynamic ranges are achieved.

In an advantageous further development, it is provided that the spin state of the electron is determined by one or more additional excitations, wherein the additional excitation is effected by electromagnetic waves, preferably light (infrared (300 GHz to 384 THz), visible light (384 THz to 789 THz), ultraviolet light (789 THz to 30 PHz)), radio waves (ultrashort waves (30 MHz to 300 MHz), short waves (3 MHz to 30 MHz), medium waves (300 kHz to 3 MHz) and long waves (30 kHz to 300 kHz)), terahertz radiation (0.1 THz to 10 THz), low frequency (1 kHz to 30 kHz) or microwaves (1 GHz to 300 GHz), by electromagnetic fields, by thermal processes or by thermionic processes. This allows, for example, interactions between different defects to be examined/the status of a defect to be read out, as a result of which qubit applications in particular are enabled. By using the determination of spin states and the spin state-selective excitation of electrons from the material and subsequent imaging, the defects are resolved spatially and simultaneously by their spin states.

In an advantageous further development, it is provided that the material is electrically grounded. This prevents the examination from being influenced by a charge on the material.

In an advantageous further development, it is provided that a bias voltage is applied across the surface of the material, wherein the bias voltage is preferably positive. This facilitates and improves the extraction of the emitted electrons and their transfer to the electron image. If the bias voltage is applied to an electrode, preferably a lattice, a large number of electrons can be accelerated simultaneously, such that a plurality of electrons can be examined in parallel, i.e. large-area imaging is possible. Alternatively, if the bias voltage is applied to a tip, the local resolution can be improved even further. However, a plurality of tips would then be required for parallel observation of a plurality of electrons. Serial scanning of the surface of the solid body could then be carried out using one or more tips.

In an advantageous further development it is provided that the material is doped, preferably doped with a donor. For example, it can be boron. This provides a defect with electrons in a particularly reliable manner, such that the defects can be examined more easily. However, the process also works in principle without doping.

In an advantageous further development, it is provided that the defect is created by at least one of the methods from the group comprising: Implantation after production of the material, doping during production of the material and by electron irradiation during or after production of the material. This allows defects to be created particularly easily and nevertheless in a determined manner, in particular with regard to their localization.

In an advantageous further development, it is provided that the surface of the material has been provided with a thin conductive layer, wherein the layer is preferably a metallic layer or a metal-coordinated molecular layer, wherein the layer consists in particular of one or two to five monolayers. This facilitates the emission of the excited electrons. The layer can preferably be applied as a "coating," i.e. by means of a coating process. However, the process also works in principle without such a layer.

In an advantageous further development, it is provided that the material is surrounded by a magnetic shield. This can be a soft magnetic material, for example. This increases precision, because external magnetic fields, such as the earth's magnetic field, cannot influence the electron emission or the path of the emitted electron.

In an advantageous further development, it is provided that the material is surrounded by a Faraday cage. This also increases the precision because external electromagnetic fields, such as those from electrical power lines, cannot influence the electron emission or the path of the emitted electron.

In an advantageous further development, it is provided that the material is arranged in a vacuum with a pressure of a maximum of 103 mbar, as a result of which the defects can be localized with particularly good spatial accuracy, because the electrons emerging from the surface of the material are not disturbed by particles.

In an advantageous further development, it is provided that the material is cooled, wherein the cooling is preferably effected in the temperature range of 0.1 K to 210 K. As a result, the defects have a defined excitation spectrum that is selective for the spin state.

In an advantageous further development, it is provided that the material is present as a solid body, preferably as a layer or bulk material, and in particular comprises a substance from the group: Diamond, silicon, silicon carbide, hexagonal boron nitride and crystalline materials with a band gap in the range of 0.1 eV to 14 eV. Extensive information is available on the defects of such solid bodies. The layer can preferably be present as an atomically thin layer in the sub-nanometer range or as a crystalline two-dimensional layer.

The device for the spatially resolved localization of a defect in a solid body, wherein the solid body has a band gap, wherein the defect has one or more electrons that has at least one energy level that lies in the band gap, is characterized in that there are means for exciting the electron that are adjusted to excite the electron, such that it is emitted from the solid material, and there are means for electron imaging.

In an advantageous further development, it is provided that the device is adjusted to carry out the disclosed process.

In an advantageous further development, it is provided that the device has the structure of a transmission electron microscope, wherein the material is arranged instead of an electron filament of the transmission electron microscope. The device is then particularly easy to produce and has a very high spatial resolution with high image quality and image robustness and automatic alignment.

In an advantageous further development, it is provided that the device is a component of a quantum computer or a quantum sensor. This means that quantum computers and quantum sensors can be operated with greater precision.

The process according to the disclosure and the device according to the disclosure are suitable to carry out quantum computing applications, quantum-based information processing or quantum sensing applications. Such processes can now be carried out with even greater precision. A very high spatial resolution can then be achieved, particularly in the field of quantum sensor technology.

In an advantageous further development, it is provided that the corresponding parts of an electron microscope are used as means for electron imaging. The entire device can thus be formed by an electron microscope that has an electron excitation, preferably a light excitation, in particular a LASER excitation, instead of or in place of the electron source.

The features and further advantages of the present invention will become apparent below from the description of two preferred exemplary embodiments in connection with the figures.

DETAILED DESCRIPTION

Figure 1:
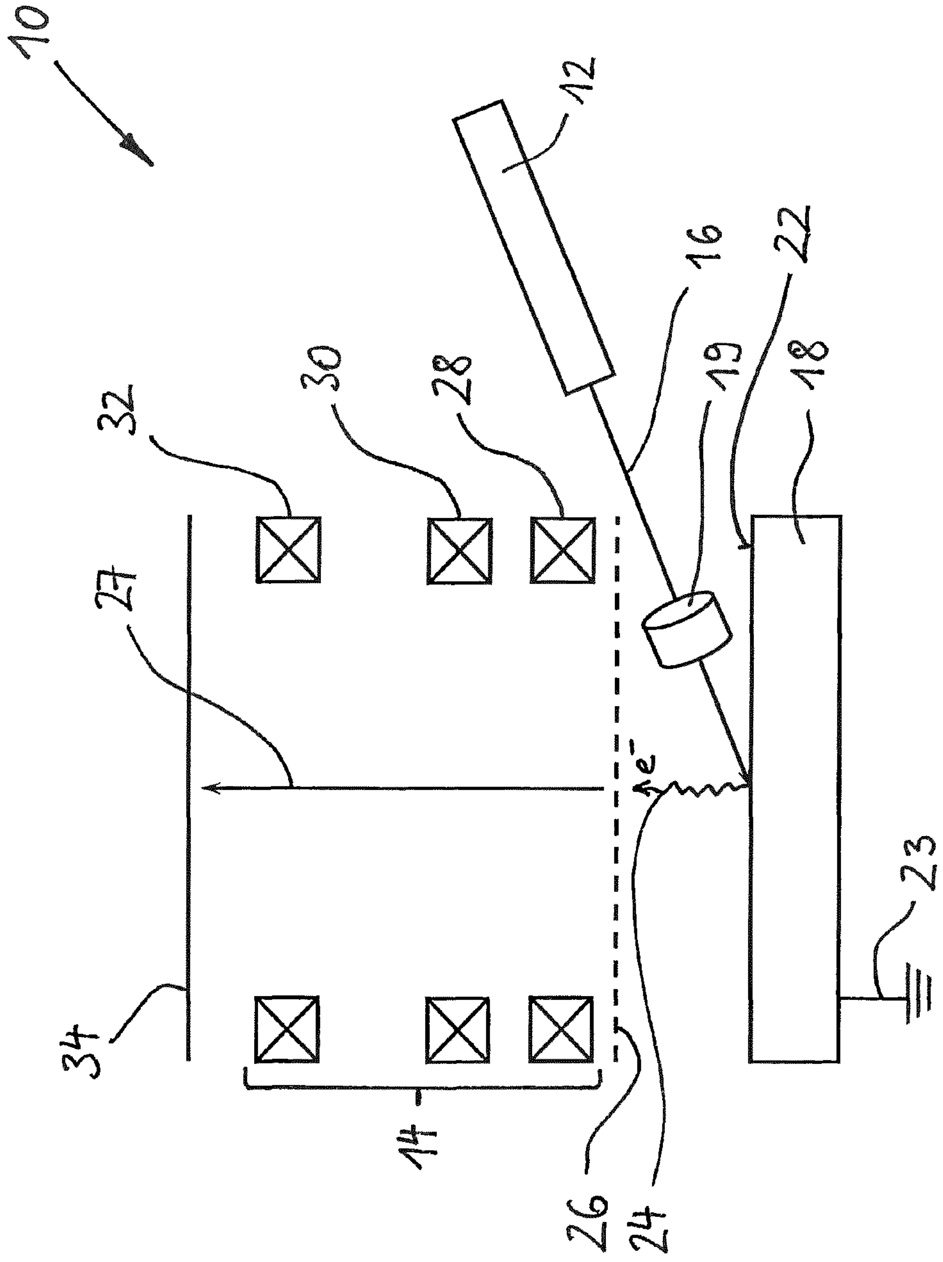
FIG. 1 shows the process for the spatially resolved localization of a defect in a material according to a first preferred embodiment.

FIG. 1 shows the device for the spatially resolved localization of a defect in a material in accordance with a first preferred embodiment.

It can be seen that the device 10 has means 12 for electron excitation and means 14 for electron imaging.

The electron excitation means 12 have, for example, a suitably controlled LASER source 12, whose LASER beam 16 can be directed onto a sample 18 arranged in a suitable holder (not shown), wherein one or more optical elements 19, such as high refraction objective lenses, lenses and optical beam sharpeners, can be used to define the beam. The electron excitation means 12 can be movable in their orientation with respect to the sample 18, such that the LASER beam 16 can be directed to a specific point 20 on the surface 22 of the sample 18. Thereby, the sample is grounded such that it cannot become charged.

In the example shown, the electron excitation means 12, is an optical source and illuminates the sample 18 from above. This is particularly useful for samples that are not radiolucent. If, on the other hand, the sample 18 is opaque, the irradiation 16 can in principle also occur from any side of the sample 18, i.e. also through a side surface of the sample 18 or from below through the sample 18.

The electron 24 associated with a defect in the sample 18 is emitted by the excitation with the LASER beam 16, if this has a sufficiently high energy, and is subsequent accelerated 27 by a metallic lattice 26 arranged above the surface 22 of the sample 18, to which a positive bias voltage is applied, such that it can be taken over by the electron image 14, or more precisely by a condenser lens 28. The bias voltage must be selected as a function of the geometry of the electrode and can range from a few mV to a plurality of kV, for example.

The accelerated electron 27 subsequently passes through an objective lens 30 and a projective lens 32 to ultimately hit a CCD surface 34. The resulting image (not shown) represents, depending on the selected optical parameters, a complete image of image in sections of the spatial coordinates of the surface 22 and shows the locations at which the electrons 24 were emitted, indicating directly the position of the defects in relation to the surface 22 of the sample 18.

The elements of the electron optics, i.e. condenser lens 28, objective lens 30 and projective lens 32, along with the electron detector 34 are standard components of a transmission electron microscope and are known to the person skilled in the art, which is why they are not explained in more detail here. Thus, conventional TEMs can preferably be used within the framework of the present invention, wherein, however, the electron filament is removed and the sample 18 is placed there instead. The actual sample holder of the TEM remains empty instead. Thereby, all other elements of the TEM can still be used, although the first of two standard capacitors of a TEM, for example, would not be required, but can still be used. This allows very high resolutions to be achieved with high image quality and image robustness and automatic alignment, because such TEM has aberration correction elements, high magnification, objective lenses with high numerical aperture, focusing elements and acceleration columns to increase the energy of the electrons.

The person skilled in the art is also familiar with the fact that there should be a vacuum between the sample surface 22 and the electron detector 34, so that the electrons 24, 27 are not undesirably influenced.

A commercial electron microscope, in particular a commercial transmission electron microscope, can thus be used for the realization of the device for the spatially resolved localization of a defect in a material, wherein its electron source and the electron accelerator can be dispensed with, but need not be. In any case, the means 12 for electron excitation in the sample 18 must be used and, to improve the device, the metallic lattice 26 for generating a bias voltage must also be used.

The process for the spatially resolved localization of a defect in a material using the device 10 is to be explained in more detail below with reference to the localization of defects in the form of nitrogen defect centers in diamond. However, the same process can also be used for any other defects and materials.

Nitrogen-vacancy (NV) centers in diamond are defects in the carbon lattice that occur when a single carbon atom is substituted by a nitrogen atom and at the same time a gap is created in adjacent lattice sites. In the negative charge state, the NV center has two unpaired electrons that form an S=1 system with triplet electron spin states (ms=0, ±1). For an NV center, the electronic interaction with the crystal symmetry results in the ms=±1 being degenerate and separated from the ms=0 around 2.87 GHz, which is called zero-field splitting. The spin subplanes ms=±1 further divide into two planes in a non-zero magnetic field given by $\delta=2\gamma B$.

Under ambient conditions, the electron allocated to the NV center can be optically excited from the ground state to higher electronic states by green light with a wavelength of 532 nm (see Gruber, A. (1997) "Scanning Confocal Optical Microscopy and Magnetic Resonance on Single Defect Centers," Science, 276 (5321), pp. 2012-2014, DOI: 10.1126/science.276.5321.2012). The excited electron falls back to the ground state through luminescence emission or non-radiative processes. The excitation and de-excitation pathways are determined by the spin state of the electrons (see Goldman, M. L., Sipahigil, A., et al. (2015) "Phonon-Induced Population Dynamics and Intersystem Crossing in Nitrogen-Vacancy Centers," Physical Review Letters, 114 (14), p. 145502, DOI: 10.1103/PhysRevLett.114.145502 und Goldman, M. L., Doherty, M. W., et al. (2015) "State-selective intersystem crossing in nitrogen-vacancy centers," Physical Review B, 91 (16), p. 165201, DOI: 10.1103/PhysRevB.91.165201). For example, optical transitions are spin-conserving, so the electron in the ms=0 (or ms=±1) ground state is excited to the ms=0 (or ms=±1) state in the excited manifold. The cross-system crossing rates of the excited manifold are also spin-selective. This leads to a special feature in the case of nitrogen defects. The spin state can also be optically initialized at room temperature with very high efficiency using light alone. After a few microseconds of green illumination, a single NV center could be initialized to spin ms=0 sub-level (see Harrison, J., Sellars, M. J. and Manson, N. B. (2006) "Measurement of the optically induced spin polarisation of N-V centres in diamond," Diamond and Related Materials, 15 (4-8), pp. 586-588, DOI: 10.1016/j.diamond.2005.12.027 and Robledo, L. et al. (2011) "Spin dynamics in the optical cycle of single nitrogen-vacancy centres in diamond," New Journal of Physics, 13 (2), p. 025013, DOI: 10.1088/1367-2630/13/2/025013).

Figure 2:
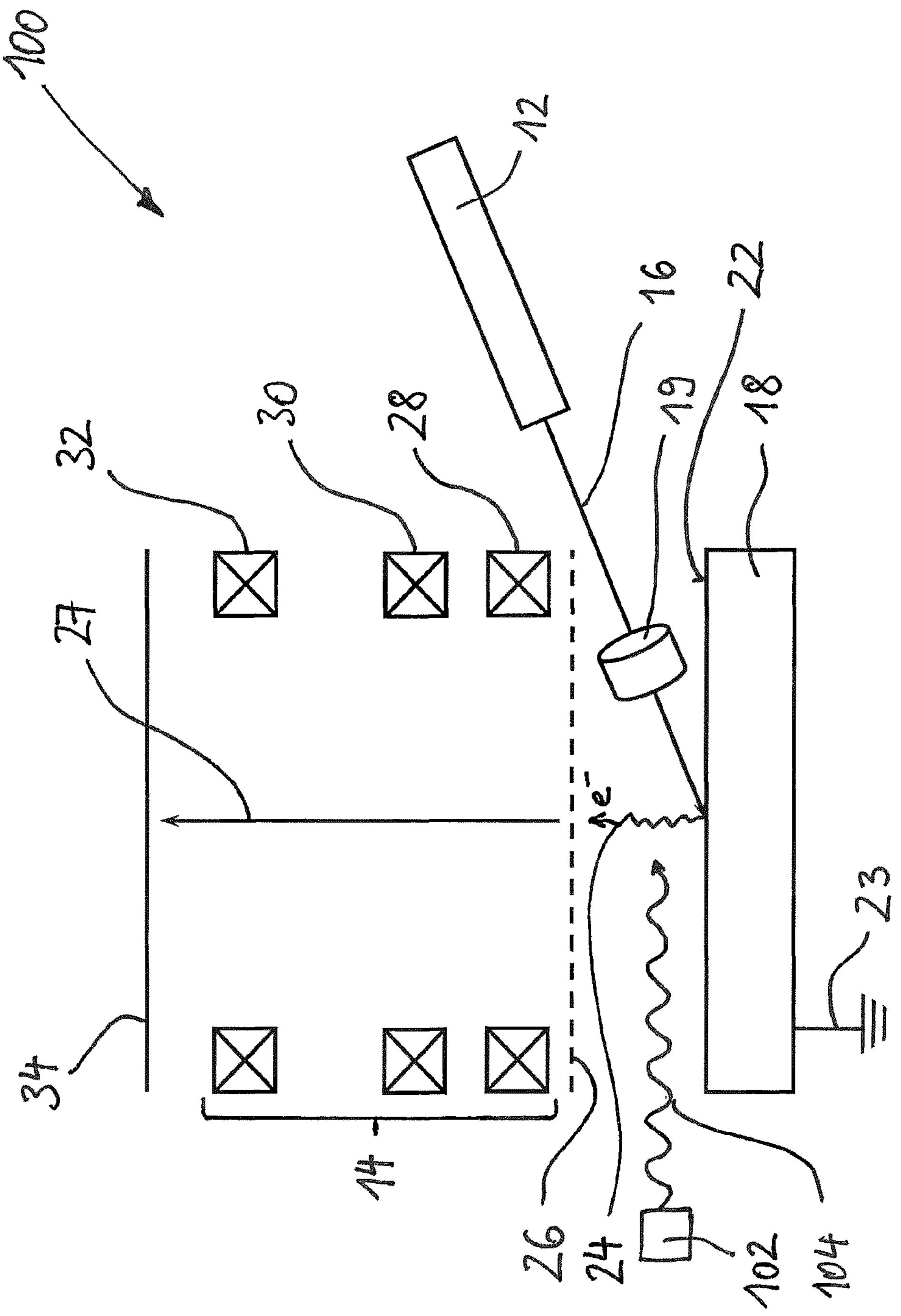
FIG. 2 shows the process for the spatially resolved localization of a defect in a material according to a second preferred embodiment.

Since the spin state can be initialized in the state ms=0, a microwave field can be applied in order to induce a spin transition to the state ms=+1 or ms=1, as is possible with the device 100 shown in FIG. 2, which additionally has a microwave source 102 for microwaves 104 to be radiated in, while all other components correspond to those of the device 10 of FIG. 1.

This spin flip leads to a new ground level of the electron, which is why it undergoes a different optical excitation-de-excitation cycle. This leads to a decrease in the intensity of the luminescence emission. This is referred to as optically captured magnetic resonance. Since this is a far-field technique, it suffers from the limited optical resolution, which practically prohibits imaging or resolving two such NV defects separated within the diffraction limit (approximately 200-250 nm).

Such diamond NV centers are promising solid-body qubits for quantum information processing and quantum computing (see DiVincenzo, D. (2010) "Better than excellent," Nature Materials, 9 (6), pp. 468-469, DOI: 10.1038/nmat2774). The electron associated with the NV center has very good spin coherence properties even at room temperature (see Balasubramanian, G. et al. (2009) "Ultralong spin coherence time in isotopically engineered diamond," Nature Materials, 8 (5), pp. 383-387, DOI: 10.1038/nmat2420 and Herbschleb, E. D. et al. (2019) "Ultra-long coherence times amongst room-temperature solid-state spins," Nature Communications, 10 (1), p. 3766, DOI: 10.1038/s41467-019-11776-8). This is also a good prerequisite for a possible quantum processor/computer. Such qubits could be produced, for example, by implanting ions other than carbon into pure diamond substrates (see Jakobi, I. et al. (2016) "Efficient creation of dipolar coupled nitrogen-vacancy spin qubits in diamond," Journal of Physics: Conference Series, 752, p. 012001, DOI: 10.1088/1742-6596/752/1/012001; Scarabelli, D. et al. (2016) "Nanoscale Engineering of Closely-Spaced Electronic Spins in Diamond," Nano Letters, 16 (8), pp. 4982-4990, DOI: 10.1021/acs.nanolett.6b01692; Haruyama, M. et al. (2019) "Triple nitrogen-vacancy centre fabrication by C5N4Hn ion implantation," Nature Communications, 10 (1), p. 2664, DOI: 10.1038/s41467-019-10529-x; Ishiwata, H. et al. (2017) "Perfectly aligned shallow ensemble nitrogen-vacancy centers in (111) diamond," Applied Physics Letters, 111 (4), p. 043103, DOI: 10.1063/1.4993160 and Ozawa, H. et al. (2017) "Formation of perfectly aligned nitrogen-vacancy-center ensembles in chemical-vapor-deposition-grown diamond (111)," Applied Physics Express, 10 (4), p. 045501, DOI: 10.7567/APEX.10.045501).

Such NV centers are advantageous for quantum computers, because they can be generated in close proximity to one another. A single NV center is atomic in size (in practice, the electrons are confined to a few lattice constants that are only approximately 200 picometers in size). Such single quantum spin system interacts with other quantum systems in a defined way, which is predetermined by the laws of quantum physics. In the context of quantum information science, a single-electron quantum system can be referred to as a qubit. Such qubits can be made to interact with another qubit or a network of qubits. In the case of electron spins, they can be made to interact by magnetic dipole-dipole coupling. However, this interaction strength, which is given in terms of the coupling strength, decreases with the third power of the distance (see Neumann, P. et al. (2010) "Quantum register based on coupled electron spins in a room-temperature solid," Nature Physics, 6 (4), pp. 249-253, DOI: 10.1038/nphys1536). It is therefore important to arrange the qubits (NV centers) close to one another in the range of 5 to 20 nanometers (see Jakobi, I. et al. (2016) "Efficient creation of dipolar coupled nitrogen-vacancy spin qubits in diamond," Journal of Physics: Conference Series, 752, p. 012001, DOI: 10.1088/1742-6596/752/1/012001 and Neumann, P. et al. (2010) "Quantum register based on coupled electron spins in a room-temperature solid," Nature Physics, 6 (4), pp. 249-253, DOI: 10.1038/nphys1536). As outlined above, a network of two or more NV centers cannot be resolved individually by optical means in these tight conditions. Therefore, their spin state, which would be useful for processing quantum information, cannot be read out.

With the method for the spatially resolved localization of a defect in a material, individual qubits can be localized with very high resolution even with a resolution in the subnanometer range and a large number of spins and their networks. Such new method would enable detectors for a large quantum processor, for readout for quantum capturing and for quantum-capable measurement networks, for which independent protection is therefore claimed.

A single NV defect has an electronic level structure within the band gap of the diamond. Thereby, the ground state (2A) and the excited state (3E) form an electronic triplet, which can be excited by green light (532 nm) at room temperature. The electron enters the excited state 3E by absorbing a photon. If the laser power is now increased (a pulsed laser source can be used for this purpose) or the laser energy is increased by selecting a shorter wavelength of, for example, 405 nm or shorter, a two-photon process is induced, through which the electron is excited into the conduction band (see Bourgeois, E. et al. (2015) "Photoelectric detection of electron spin resonance of nitrogen-vacancy centres in diamond," Nature Communications, 6 (1), p. 8577, DOI: 10.1038/ncomms9577 and Siyushev, P. et al. (2019) "Photoelectrical imaging and coherent spin-state readout of single nitrogen-vacancy centers in diamond," Science, 363 (6428), pp. 728-731, DOI: 10.1126/science.aav2789). The excitation wavelength is selected so that only the defects are photoionized. In addition, the material is otherwise defect-free, such that no other photoelectrons are emitted by optical excitation.

Such photoionized electron 24 is then emitted into the vacuum by a positive bias voltage of the lattice 26, which is applied outside the diamond. Thereby, such photoemitted electron 24 is collected by the lattice 26 and accelerated to specific energies of 0.01 eV to 10 eV 27, which are sufficient for the desired electron optics used and the required resolution. The accelerated electron 27 is then directed into an objective lens 30 as in a TEM. Thereby, the electron 24 passes through a series of electron optics 28, 30, 32, which are produced by magnetic or electromagnetic lenses and condenser lens 28. Thereby, the electron emission from the NV center is magnified by a series of lenses, in order to produce a suitable image in the image plane of the electron microscope. As a result, a spatial resolution for the defects in the material 18 of at least 25 nm, preferably at least 20 nm and in particular in the range of 0.1 nm to 20 nm can be achieved.

The electron optical components 28, 30, 32 could have a series of aberration correction elements (not shown) in order to produce a high-quality image with minimal distortion at the detector 34.

The array detector (camera) 34 placed in the image plane are to be able to record the number of electrons 27 arriving at each pixel. There are various options for detector cameras 34, which are used in a similar way to a TEM camera. It could be a simple phosphor screen, CCD cameras with microchannel plate amplification and cameras with direct electron detectors.

The spin-selective excitation that produces the photoemitted electrons 24 is captured and imaged by the array detector. The electron 27 reaching the image plane could be amplified by the microchannel plates (MCPs) or amplifiers or even direct electron detectors with high amplification. Since electron amplification occurs at the detector 34, the process is not limited by photon shot noise, which is the limitation of optically captured magnetic resonance or imaging in the prior art.

The electron image detectors offer an exceptional signal-to-noise ratio of greater than 10 to 30, even for a single electron 27. This superior detection sensitivity offers an excellent possibility for detecting spin even in individual images. This enables a high contrast of the spin states and better fidelity of reproduction of the spin states. These are features that are highly desirable for quantum information and processing applications.

From the above representation, it is clear that the present disclosure provides a method with which defects in materials, preferably in solid bodies, can be localized with a significantly higher local resolution than before. Such defects can be quickly and economically optically imaged with high spatial resolution. Above all, it is possible to contactlessly spin-selectively excite and capture or image defects in the solid body with high sensitivity, high dynamic range, large field of view and excellent resolution, which far exceeds the present capabilities of optical detection processes. The device according to the disclosure and the process according to the disclosure are also extremely useful for quantum calculation using defect spins in solid bodies, for quantum-capable capturing and for quantum-capable measurement networks.

All the features shown in the general description of the invention, the description of the exemplary embodiments, the following claims and in the drawing can be substantial to the invention, both individually and in any combination with one another. Such features or combinations of features can each constitute an independent invention, the claiming of which is expressly reserved. Individual features from the description of an exemplary embodiment do not necessarily have to be combined with one or more or all of the other features specified in the description of this exemplary embodiment; in this respect, each sub-combination is expressly disclosed. In addition, subject features of the device can also be reformulated for use as process features and process features can be reformulated for use as subject features of the device. Such a reformulation is thus automatically disclosed.

LIST OF REFERENCE SIGNS

10 Device in accordance with a first preferred embodiment
12 Means for electron excitation, LASER source
14 Means for electron imaging
16 LASER beam
18 Sample
19 Optical element
20 Specific point on the surface 22 of the sample 18
22 Surface of the sample 18
23 Grounding the sample 18
24 The electron associated with a defect in the sample 18

26 Metallic lattice
27 Emitted and accelerated electron
28 Condenser lens
30 Objective lens
32 Projective lens
34 Electron detector, CCD surface
100 Device in accordance with a second preferred embodiment
102 Microwave source
104 Microwave radiation

The invention claimed is:

1. A process for spatially resolved localization of a defect in a material that has a band gap, the defect having an electron having at least one energy level that lies in the band gap, the process comprising:
providing a transmission electron microscope;
removing an electron filament from the transmission electron microscope;
arranging the material a position previously occupied by the electron filament;
selectively exciting the electron from the at least one energy level in the band gap such that the electron is emitted from the material;
subsequently carrying out an electron imaging with an electron optics and an electron detector; and
imaging the defect with a spatial resolution sub-25 nm.

2. The process according to claim 1,
wherein the material (18) is a solid body and comprises a substance selected from the group consisting of diamond, silicon, silicon carbide, hexagonal boron nitride, and crystalline materials with a band gap in a range of 0.1 eV to 14 eV,
wherein the solid body is an atomically thin layer in a sub nanometer range or a crystalline two-dimensional layer or a bulk material, and
wherein the defect is imaged with a spatial resolution in a range of 0.1 nm to 20 nm.

3. The process according to claim 1,
wherein the electron detector is a microchannel plate, a direct electron detector, an electron multiplier CCD, an sCMOS, or a phosphor screen, and
wherein the electron optics is a magnetic element or electromagnetic element.

4. The process according to claim 1,
wherein exciting the electron is effected by electromagnetic waves.

5. The process according to claim 4,
wherein exciting the electron is effected by focusing light from a LASER light source with an objective lens on a surface region of the material.

6. The process according to claim 4,
wherein exciting the electron is effected in evanescent wave geometry.

7. The process according to claim 4,
wherein the defect is arranged in a light-confining nanostructure, cavity or optical resonator.

8. The process according to claim 1, further comprising determining a spin state of the electron by additional excitation with electromagnetic waves, by electromagnetic fields, by thermal processes, or by thermionic processes.

9. The process according to claim 1, further comprising electrically grounding the material (18).

10. The process according to claim 1, further comprising applying a positive bias voltage (26) to a grid (26) or a tip above a surface of the material.

11. The process according to claim 1,
wherein the material (18) is doped with a donor.

12. The process according to claim 1, further comprising:
creating the defect by at least one of
implantation after production of the material,
doping during production of the material, or
electron irradiation during or after production of the material.

13. The process according to claim 1, further comprising:
providing a thin metallic or a metal-coordinated molecular conductive layer on a surface of the material,
wherein the layer comprises one to five monolayers.

14. The process according to claim 1, further comprising:
surrounding the material by a magnetic shielding, and/or
surrounding the material by a Faraday cage.

15. The process according to claim 1, further comprising:
cooling the material in a temperature range from 0.1 K to 210 K.

16. The process according to claim 1, further comprising:
wherein selectively exciting the electron is performed with an excitation wavelength selected so that only the defect is photoionized.

17. A device for spatially resolved localization of a defect in a material,
the material having a band gap, and
the defect having an electron that has at least one energy level that lies in the band gap, the device comprising:
a transmission electron microscope comprising electron optics and an electron detector; and
a laser source configured to direct a laser beam onto the material to selectively excite the electron from the at least one energy level in the band gap such that the electron is emitted from the material;
wherein an electron filament of the transmission electron microscope has been removed;
wherein the material is arranged at a position previously occupied by the electron filament within the transmission electron microscope such that the material replaces the electron filament as an electron-emitting source; and
wherein the device is configured to image the defect with a spatial resolution sub-25 nm.

18. The device according to claim 17,
wherein the device is a component of a quantum computer or a quantum sensor.

* * * * *